United States Patent
Koka et al.

(10) Patent No.: US 8,108,631 B2
(45) Date of Patent: Jan. 31, 2012

(54) TRANSACTIONAL MEMORY SUPPORT FOR NON-COHERENT SHARED MEMORY SYSTEMS USING SELECTIVE WRITE THROUGH CACHES

(75) Inventors: Pranay Koka, Austin, TX (US); Brian W. O'Krafka, Austin, TX (US)

(73) Assignee: Oracle America, Inc., Redwood City, CA (US)

( * ) Notice: Subject to any disclaimer, the term of this patent is extended or adjusted under 35 U.S.C. 154(b) by 397 days.

(21) Appl. No.: 12/176,298

(22) Filed: Jul. 18, 2008

(65) Prior Publication Data

US 2010/0017572 A1    Jan. 21, 2010

(51) Int. Cl.
*G06F 13/00* (2006.01)
*G06F 13/28* (2006.01)
*G06F 9/26* (2006.01)
*G06F 9/34* (2006.01)

(52) U.S. Cl. ........ 711/154; 711/141; 711/206; 711/210; 711/E12.014; 711/E12.034

(58) Field of Classification Search .................. None
See application file for complete search history.

(56) References Cited

U.S. PATENT DOCUMENTS 5,806,075 A *  9/1998  Jain et al. ............................. 1/1
2007/0198518 A1 * 8/2007 Luchangco et al. ............ 707/8

\* cited by examiner

*Primary Examiner* — Reginald Bragdon
*Assistant Examiner* — Eric S Cardwell
(74) *Attorney, Agent, or Firm* — Osha • Liang LLP

(57) ABSTRACT

A method, including: initiating a memory operation at a first node including a first memory controller (MC) and a transaction table configured to store a list of nodes affected by the memory operation, transmitting a store request signal to a second node including a second MC and an access table (AT) where the store request signal includes data from the first MC, storing data to the AT in entries corresponding to memory address(es) (MAs) affected by the memory operation, identifying a memory conflict with one or more nodes in the list of nodes when the MAs affected by the memory operation are also affected by one or more conflicting transactions listed in the AT, transmitting an abort signal from the second node to each of the nodes corresponding to the memory conflict, and transmitting an intent to commit signal from the first node to the second node.

16 Claims, 6 Drawing Sheets

TRANSACTIONAL MEMORY SUPPORT FOR NON-COHERENT SHARED MEMORY SYSTEMS USING SELECTIVE WRITE THROUGH CACHES

BACKGROUND

As current designs close in on the physical limits of semiconductor based microprocessors, new problems, such as increased heat dissipation and power consumption, have prompted designers to consider alternatives to the traditional single die microprocessor. Accordingly, designers may employ parallel processing systems that include multiple microprocessors working in parallel in order to surpass the physical limits of a single processor system. However, such parallel systems with multiple processors place different sets of constraints on designers in comparison to single processor systems. For example, parallel processor based systems may have no centralized memory module and instead rely on linking memory modules at each node to create a global memory address space. These systems may have transactional memory support in order to facilitate concurrency control among the various memory modules. However, transactional memory support does not necessarily imply that the system has global cache or memory space coherence. Accordingly, it may be necessary to detect memory conflicts within the transactional memory system in shared memory systems that do not employ global memory coherence.

SUMMARY OF THE INVENTION

In general, one or more aspects of the invention relate to controlling transactions in a transactional shared memory system having a plurality of nodes connected through an interconnect network. The method involves initiating a memory operation at a first node comprising a first memory controller and a transaction table, wherein the transaction table is configured to store a list of nodes affected by the memory operation, transmitting a store request signal through the interconnect network to a second node comprising a second memory controller and an access table, wherein the store request signal comprises memory operation data from the first memory controller, storing memory operation data to the access table in entries corresponding to one or more memory addresses affected by the memory operation, identifying a memory conflict with one or more nodes in the list of nodes when the one or more memory addresses affected by the memory operation are also affected by one or more conflicting transactions listed in the access table, transmitting an abort signal from the second node to each of the one or more nodes corresponding to the memory conflict, and transmitting an intent to commit signal from the first node to the second node.

In general, one or more aspects of the invention relate a method of detecting memory conflicts in a transactional shared memory system having a plurality of nodes connected through an interconnect network. The method includes initiating a memory operation at a first node comprising a first memory controller and a transaction table, wherein the transaction table is configured to store a list of nodes affected by the memory operation, transmitting a store request signal through the interconnect network to a second node comprising a second memory controller and an access table, wherein the store request signal comprises memory operation data from the first memory controller, storing the memory operation data to the access table and indexing the memory operation data by memory addresses affected by the memory operation, and identifying a memory conflict with one or more nodes when the memory addresses affected by the memory operation are also affected by one or more conflicting transactions in the access table.

In general, one or more aspects of the invention relate a transactional shared memory system. The system includes a plurality of nodes, each connected through an interconnect network and comprising a memory module, a plurality of memory controllers, each corresponding to one of the plurality of nodes, and a plurality of access tables, each corresponding to one of the plurality of memory controllers and configured to store remote transaction data and memory addresses affected by a remote memory operation corresponding to the remote transaction data, wherein each of the plurality of memory controllers is configured to detect memory conflicts with one or more of the plurality of nodes.

Other aspects and advantages of the invention will be apparent from the following description and the appended claims.

DETAILED DESCRIPTION

Generally, embodiments of the disclosed invention relate to a system for and method of detecting memory conflicts in a shared memory system in which multiple processors, or nodes, may share memory address space with each other over an interconnect network. Specifically, embodiments of the disclosed invention relate to a system and method for detecting memory conflicts when they occur ("eager detection") in a shared memory system without global cache or memory space coherence.

Specific details of the present disclosure will now be described in detail with reference to the accompanying figures.

Figure 1:
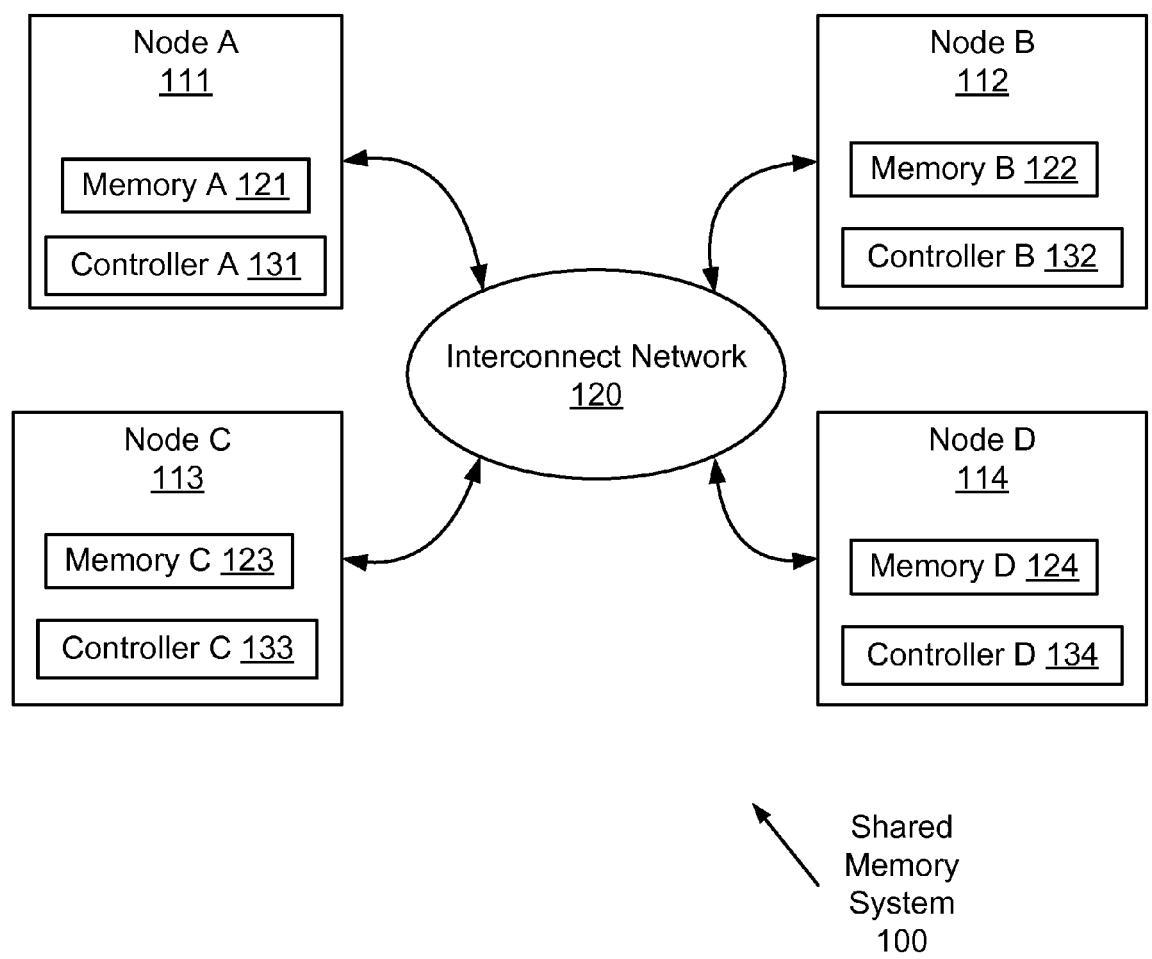
FIG. 1 shows a shared memory system in accordance with one or more embodiments disclosed herein.

Referring now to FIG. 1, a shared memory system 100 including four nodes (e.g., node A 111, node B 112, node C 113, and node D 114) and an interconnect network 120 is shown in accordance with one or more embodiments of the invention. In one or more embodiments of the invention, each of the nodes 111, 112, 113, and 114 is able to transmit data signals to, and receive data signals from, each of the other nodes over the interconnect network 120. For example, each of the nodes may transmit data signals comprising memory addresses and data among each other in order to facilitate a shared memory system.

Each of the nodes 111, 112, 113, and 114 may be a processor, or a group of processors, in a larger computing system. In accordance with one or more embodiments of the shared memory system 100, each of the nodes 111, 112, 113, and 114 may include memory modules 121, 122, 123, and 124. Accordingly, in this embodiment, the memory modules 121, 122, 123, and 124 collectively make up the shared memory space of the shared memory system 100. Because the interconnect network 120 introduces delay into the system, each of the memory modules 121, 122, 123, and 124 may further include a cache to prevent unnecessary memory requests across the interconnect network 120. Further, each of the nodes 111, 112, 113, and 114 may process data in parallel and include support for a transactional based global memory system. Thus, at a given point in time, transactions being processed at two or more of the nodes 111, 112, 113, and 114 may simultaneously affect a specific memory address located on one of the memory modules 121, 122, 123, and 124, thereby causing a memory conflict.

In order to mitigate memory conflicts, each of the nodes 111, 112, 113, and 114 may include memory controllers 131, 132, 133, and 134, respectively, in accordance with one or more embodiments of the disclosed invention. All accesses to the global memory space must be made through a given node's memory controller. The memory controller may, for example, then determine whether a given memory address is a local address or a remote address that must be accessed through the interconnect network. In accordance with one or more embodiments of the disclosed invention, the memory controllers 131, 132, 133, and 134 may detect memory conflicts within the shared memory system 100.

Figure 2:
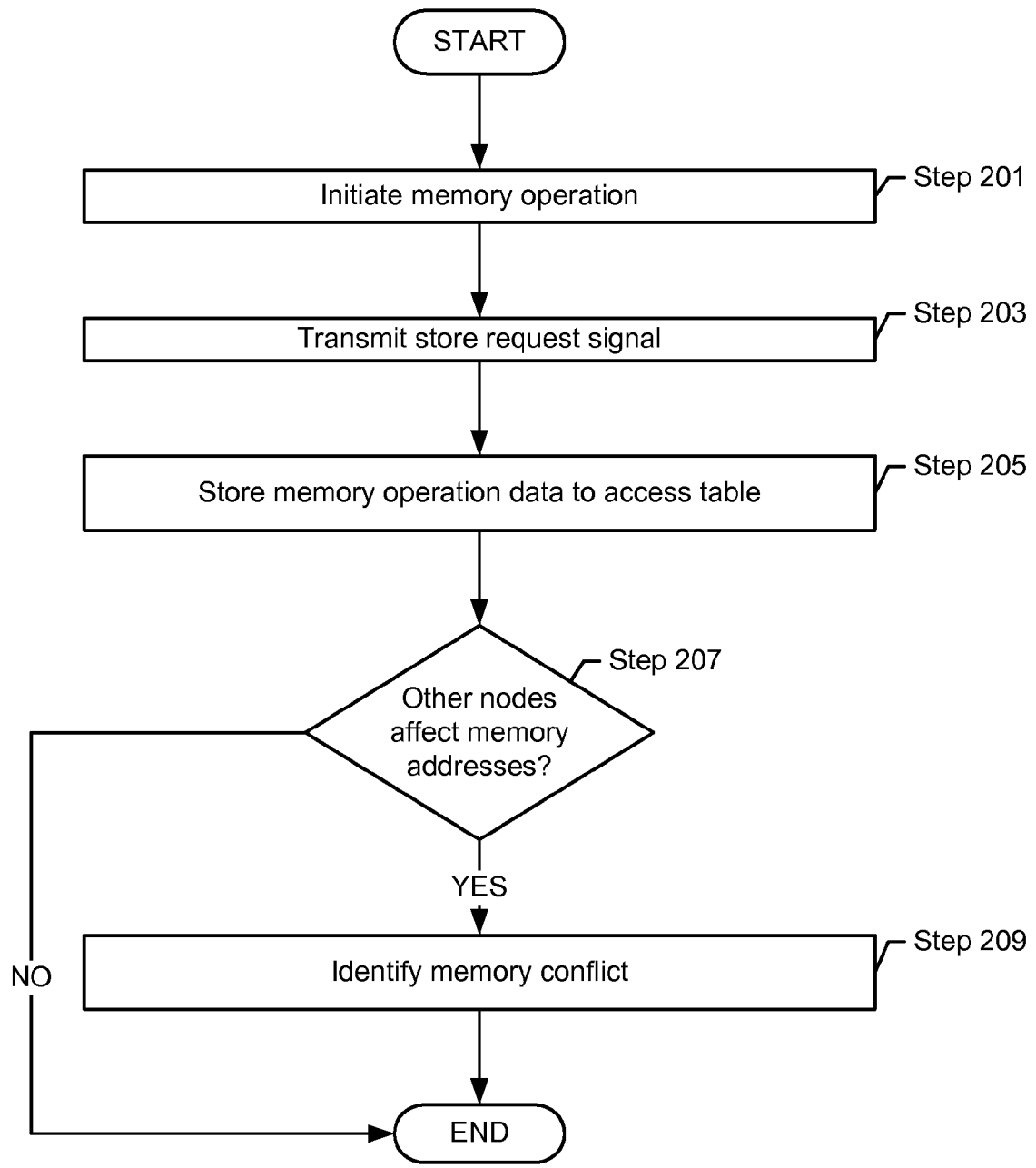
FIG. 2 shows a flow chart of a method detecting memory conflicts in accordance with one or more embodiments disclosed herein.

Referring now to FIG. 2, a method of detecting a memory conflict within the shared memory system is shown in accordance with one or more embodiments of the invention. First, in step 201, a node initiates a memory operation to access memory requested by, for example, software being processed on the node in accordance with one or more embodiments of the invention. A memory operation may, for example, be a single instruction included in a series of instructions that make up a transaction. For example, node A 111 initiates a memory operation through the memory controller A 131 that may result in a new value being stored to a memory address located at node C 113. Accordingly, in step 203, the memory controller A 131 transmits a store request signal over the interconnect network 120 to the memory controller 133 located at node C 113. The store request signal may include, for example, memory operation data including transaction identification data and access type. Upon receiving a store request signal, in step 205, the memory controller 133 stores the memory operation data to an access table indexed by one or more memory addresses that the memory operation may affect in accordance with one or more embodiments of the invention. Next, in step 207, the memory controller 131 may search the access table to determine whether any other memory operations also affect the same memory address. Finally, in step 209, the memory controller 131 may identify that a memory conflict has occurred if it finds that other memory operations may affect the same memory address in accordance with one or more embodiments of the invention.

Figure 3A:
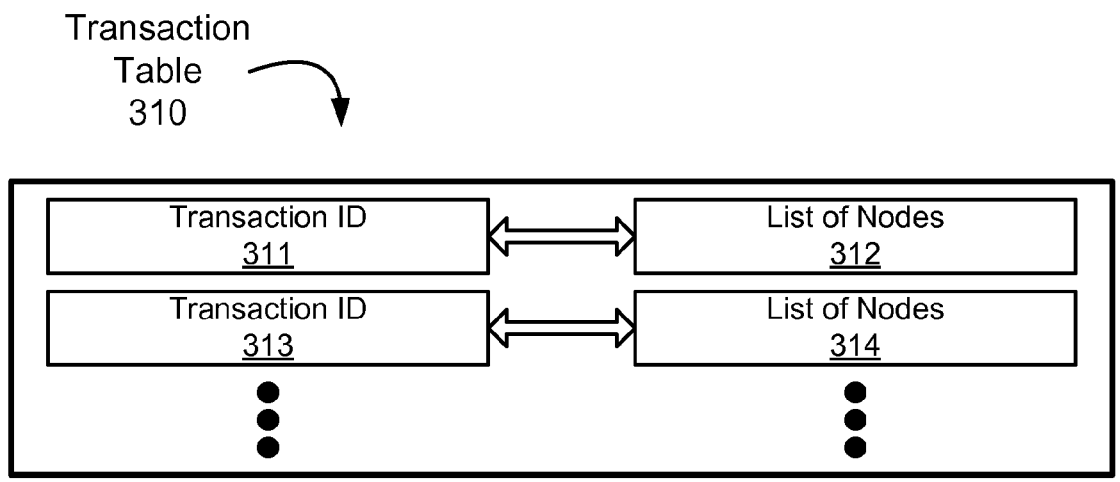
FIG. 3(a) shows a transaction table in accordance with one or more embodiments disclosed herein.

Referring now to FIG. 3(a), a transaction table 310 is shown in accordance with embodiments of the invention. The transaction table 310 may be implemented on a memory controller in order to track transactions and any remote nodes that these transactions may affect. For example, transaction ID 311 is associated with a list of nodes 312, thereby indicating that memory operations within transaction ID 311 may affect memory addresses stored at the nodes listed in the list of nodes 312. Each of the memory controllers in the shared memory system may implement a transaction table 310 to keep track of outstanding transactions. Once a transaction is completed, the corresponding entry may be deleted from the transaction table 310.

Figure 3B:
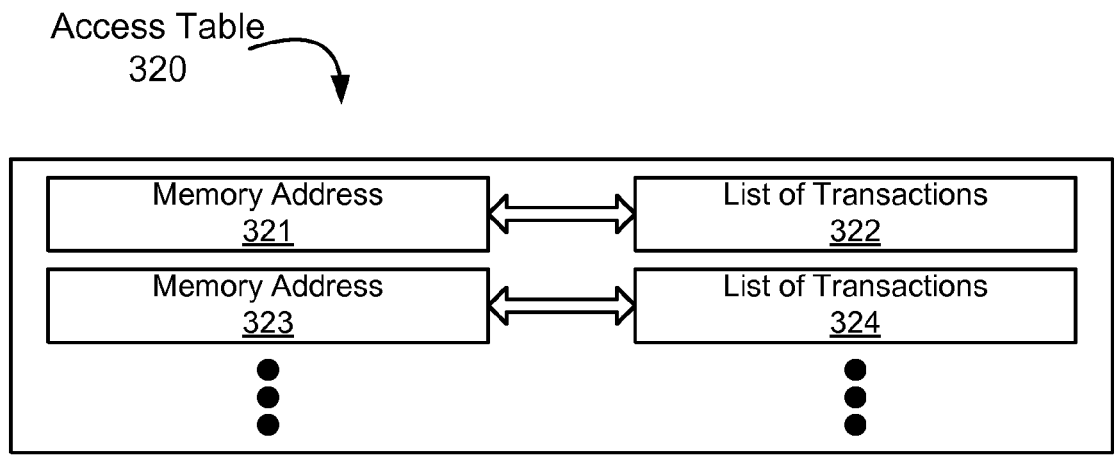
FIG. 3(b) shows an access table in accordance with one or more embodiments disclosed herein.

Referring now to FIG. 3(b), an access table 320 is shown in accordance with embodiments of the invention. The access table 320 may be implemented on a memory controller in order to track memory addresses and any memory operation requests that may affect the memory addresses. For example, memory address 321 is associated with a list of transactions 322, thereby indicating that memory address 321 may be affected by each of the memory operation requests included in the list of transactions 322. Each of the memory controllers in the shared memory system may implement an access table 320 to keep track of outstanding memory operation requests from remote nodes that may affect the local memory module. Each of the transactions in the list of transaction 322 may include, for example, a transaction ID, memory operation data, and an access type. Once a transaction is completed, the corresponding transaction may be deleted from a list of transactions in the access table 320.

Figure 3C:
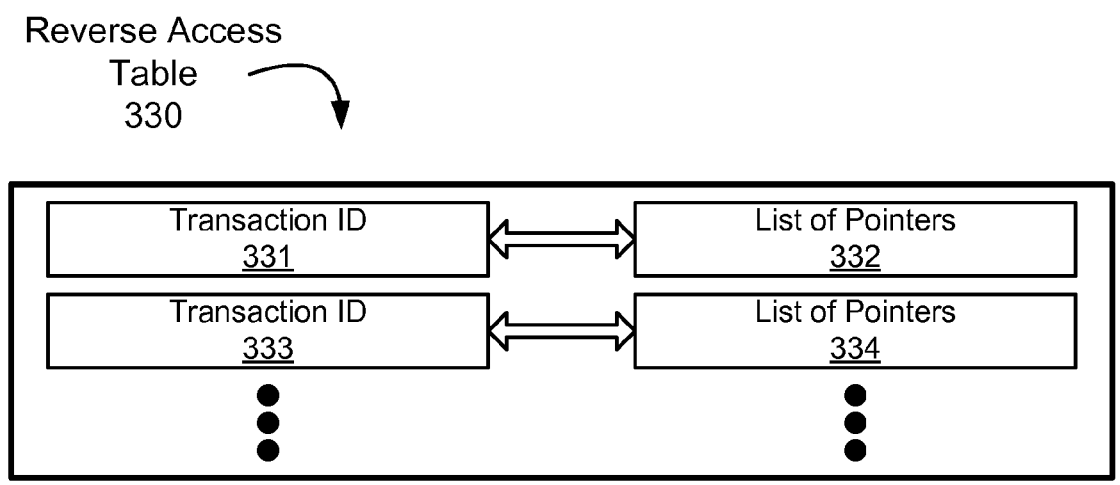
FIG. 3(c) shows a reverse access table in accordance with one or more embodiments disclosed herein.

Referring now to FIG. 3(c), a reverse access table 330 is shown in accordance with embodiments of the invention. The access table 330 may be implemented on a memory controller in order to track outstanding transaction IDs and pointers to information stored in an access table. For example, transaction ID 331 is associated with a list of pointers 332. Each of the pointers in the list of pointers 332 points to an entry in an access table, thereby rendering faster access to a list of transactions that may conflict with transaction ID 331. Each of the memory controllers in the shared memory system may implement a reverse access table 330 to quickly access outstanding transaction requests and any transactions that may conflict with the transaction requests. Once a transaction is completed, the corresponding transaction may be deleted from the access table 330.

Figure 4:
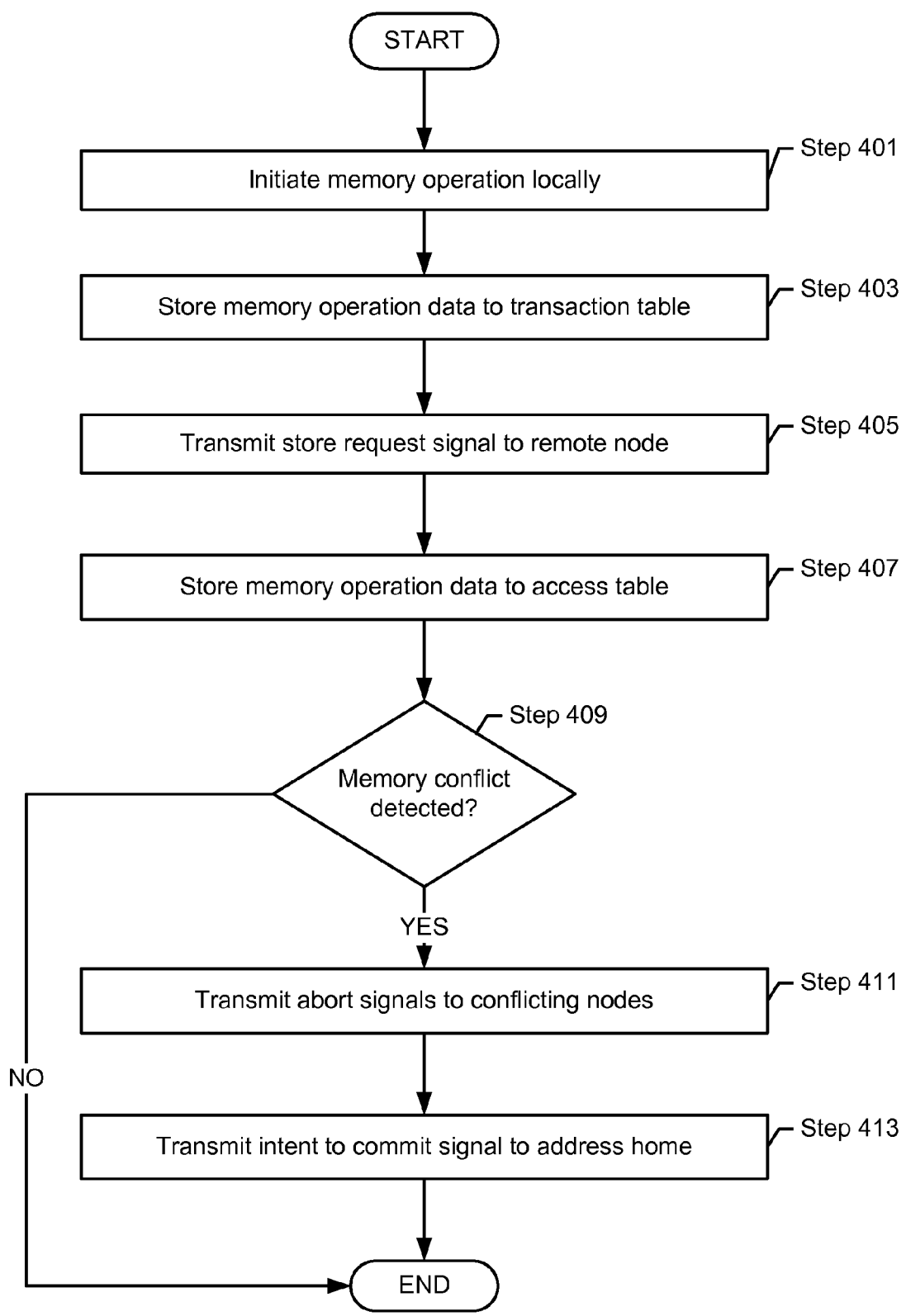
FIGS. 4-5 show a flow chart of a method of controlling memory operations in accordance with one or more embodiments disclosed herein.

Referring now to FIG. 4, a method of controlling memory operations in a shared memory system having a plurality of nodes is shown in accordance with embodiments of the invention. First, in step 401, a node initiates a memory operation to access memory requested by, for example, software being processed on the node in accordance with one or more embodiments of the invention. For example, node A 111 initiates a memory operation through the memory controller A 131 that will result in a new value being stored to a memory address located at node C 113. Memory controller A 131 may also enter the transaction ID into a transaction table and store any nodes that the memory operation may affect through remote memory access.

Accordingly, in step 403, the memory controller A 131 transmits a store request signal over the interconnect network 120 to the memory controller C 133 located at node C 113 in accordance with one or more embodiments of the invention. The store request signal may include, for example, memory operation data including transaction identification data and access type. Upon receiving a store request signal, in step 405, the memory controller C 133 stores the memory operation data to an access table indexed by one or more memory addresses that the memory operation may affect in accordance with one or more embodiments of the invention. The memory controller C 133 may also store transaction ID data and pointers to the access table to a reverse access table in this step. Next, in step 407, the memory controller C 133 may search the access table to identify whether the memory operation conflicts with any other transactions in accordance with one or more embodiments of the invention.

In step 409, if the memory controller C 133 determines that there may be a memory conflict, the memory controller C 133 transmits an abort signal to any nodes that are processing a transaction that may conflict in accordance with one or more embodiments of the invention. For example, if the memory controller C 133 finds that node B 112 has an transaction that may affect a memory location that the memory operation affects, the memory controller C 133 would transmit an abort signal to node B 112 indicating that node B 112 should abort the conflicting transaction. Next, in step 411 the home node A 111 sends an intent to commit signal to node C 113 to request that the memory operation data written in the access table by memory controller C 133 be committed to the memory module C 123 in accordance with one or more embodiments of the invention. Node C 113 may also return a "transmit OK" signal to node A 111 acknowledging that a commit is okay for the memory operation. Finally, node C 113 may commit the memory operation to the memory module C 123 and transmit a "commit done" signal to node A 111.

Figure 5:
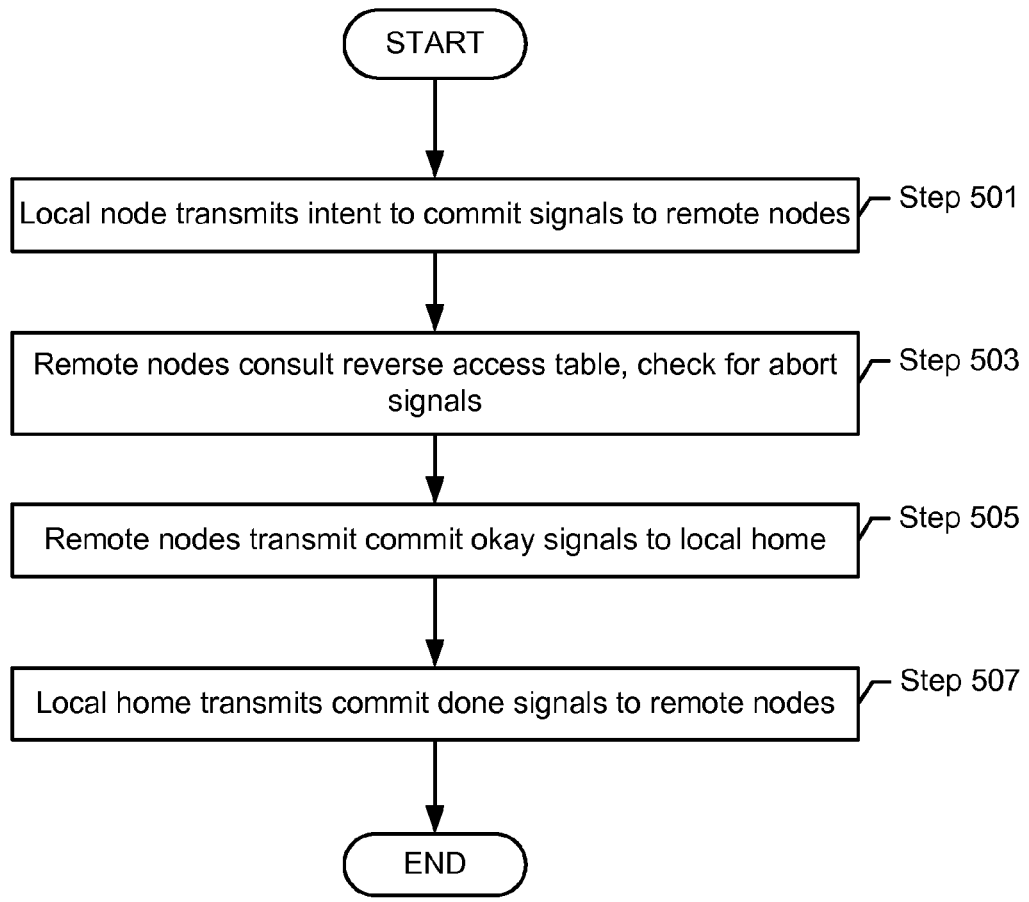

Referring now to FIG. 5, a method of committing a memory operation in a shared memory system having a plurality of nodes is shown in accordance with embodiments of the invention. First, in step 501, the local node that is the home of the memory operation retrieves the list of nodes corresponding to the memory operation from the corresponding transaction table and transmits intent to commit signals to each of the retrieved list of remote nodes. Upon receiving an intent to commit signal, in step 503, each of the remote nodes may consult the corresponding reverse access table to check for abort signals, and respond to the local node, in step 505, with a commit okay signal. The local node may then wait to receive commit okay signals from each of the remote nodes. Finally, upon receipt of the commit okay signals, in step 507, the local node may transmit commit done signals to each of the remote nodes indicating that the commit is complete.

Advantageously, separating memory operation control into the request, abort, and commit steps allows for the possibility of in-flight abort signals. A node may request to initiate a transaction, but abort before it reaches the commit step, thereby preventing an error in the shared memory system.

Figure 6:
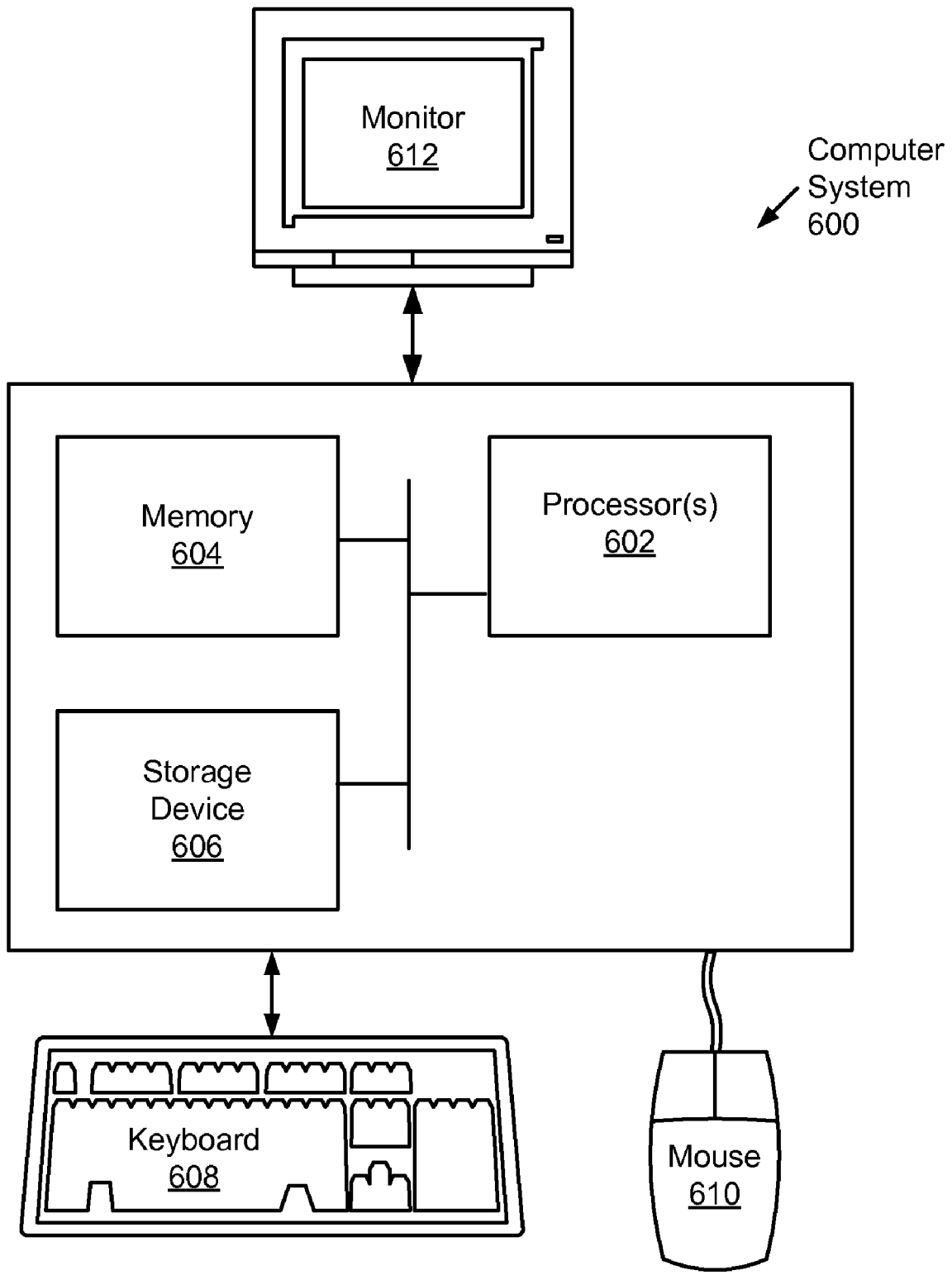
FIG. 6 shows a computer system in accordance with one or more embodiments disclosed herein.

Referring now to FIG. 6, portions of the invention may be implemented in software, such as, for example, a source of data for a memory operation and each of the tables discussed above with respect to FIGS. 3(a)-3(c). Further, whether or not a specific memory store or load is locally cached at a memory controller or initiated on a remote memory controller may be determined in software. For example, an alternative load and write instruction may be implemented in software to ensure that a specific memory store or load is written or loaded through the cache to the original location. Generally, caches may be made write-back to save bandwidth within the system, but a compiler may identify selected memory operations that may affect other nodes and force a write-through operation that is written or loaded through the cache to or from the original memory location.

These portions of the invention may be implemented on virtually any type of computer regardless of the platform being used. For example, as shown in FIG. 6, a computer system 600 includes a processor 602, associated memory 604, a storage device 606, and numerous other elements and functionalities typical of today's computers (not shown). The computer system 600 may also include input means, such as a keyboard 608 and a mouse 610, and output means, such as a monitor 612. The computer system 600 is connected to a local area network (LAN) or a wide area network (e.g., the Internet) (not shown) via a network interface connection (not shown). Those skilled in the art will appreciate that these input and output means may take other forms, now known or later developed. Further, those skilled in the art will appreciate that one or more elements of the aforementioned computer system 600 may be located at a remote location and connected to the other elements over a network.

Further, portions of the invention may be implemented on a distributed system having a plurality of nodes, where each portion of the invention may be located on a different node within the distributed system. In one or more embodiments of the invention, the node corresponds to a computer system. Alternatively, the node may correspond to a processor with associated physical memory.

In one or more embodiments of the invention, software instructions to perform embodiments of the invention, when executed by a processor, may be stored on a computer readable medium such as a compact disc (CD), a diskette, a tape, a file, or any other computer readable storage device. Further, one or more embodiments of the invention may be implemented as an Application Program Interface (API) executing on a computer system(s), where the API includes one or more software instructions.

Embodiments of the transactional shared memory system disclosed herein may exhibit one or more of the following advantages. The transactional shared memory system disclosed herein may allow for a hardware-based eager (i.e. aggressive) conflict detection scheme that is applicable to non-coherent global shared memory systems, thereby reducing wasted processing due to conflicts. Further, the transactional shared memory system disclosed herein may be light weight, and orthogonal to other components of a shared memory system, such as, for example, a store buffer. The transaction shared memory system disclosed herein may not require broadcasts to all nodes in order to detect memory conflicts. Finally, the transaction shared memory system disclosed herein may allow for minimal processing overhead for transactions with a small number of expected conflicts.

While the invention has been described with respect to a limited number of embodiments, those skilled in the art, having the benefit of this disclosure, will appreciate that other embodiments may be devised which do not depart from the scope of the invention as disclosed herein. Accordingly, the scope of the invention should be limited only by the attached claims.

What is claimed is:

1. A method of controlling memory operations in a non-coherent transactional shared memory system having a plurality of nodes connected through an interconnect network, comprising:

initiating a first memory operation at a first node comprising a first processor, a first memory, a first memory controller, and a first transaction table, and a first access table,
wherein the first transaction table is configured to store a mapping of the first memory operation and a list of nodes affected by the first memory operation, and
wherein the list of nodes stores an entry corresponding to a second node;
transmitting a plurality of memory operation data items associated with the first memory operation from the first memory controller through the interconnect network to the second node comprising a second processor, a second memory, a second memory controller, a second transaction table, and a second access table;
storing the plurality of memory operation data items associated with the first memory operation to the second access table,
wherein the second access table provides a mapping of memory addresses of the second memory and a list of memory operations affecting the memory addresses of the second memory, and wherein a memory address of the second memory is affected by the first memory operation;

receiving, by the second node, a plurality of memory operation data items associated with a second memory operation from a third node comprising a third processor, a third memory, a third memory controller, a third transaction table, and a third access table;

storing the plurality of memory operation data items associated with the second memory operation to the second access table, wherein the memory address of the second memory is affected by the second memory operation;

identifying, by the second access table, a memory conflict between the first memory operation and the second memory operation in response to the second memory operation also affecting the memory address of the second memory;

transmitting, in response to identifying the memory conflict, an abort signal from the second node to the third node; and receiving, by the second node, an intent to commit signal from the first node.

2. The method of claim 1, further comprising:

transmitting an intent to commit signal from the first node to each node listed in the list of nodes in the first transaction table.

3. The method of claim 1, further comprising:

transmitting a commit okay signal from each node listed in the list of nodes in the first transaction table to the first node.

4. The method of claim 1, further comprising:

transmitting a commit done signal from the first node to each node listed in the list of nodes in the first transaction table.

5. The method of claim 1, further comprising:

identifying, by a compiler, the first memory operation affecting the list of nodes in the first transaction table; and forcing a write-through of the first memory operation affecting the list of nodes in the first transaction table.

6. The method of claim 1, further comprising:

aborting, by the first node, the first memory operation prior to transmitting a commit done signal to each node listed in the list of nodes in the first transaction table.

7. A method of controlling memory operations in a non-coherent transactional shared memory system having a plurality of nodes connected through an interconnect network, comprising:

initiating a first memory operation at a first node comprising a first processor, a first memory, a first memory controller, and a first transaction table, and a first access table, wherein the first transaction table is configured to store a mapping of the first memory operation and a list of nodes affected by the first memory operation, and wherein the list of nodes stores an entry corresponding to a second node;

transmitting a plurality of memory operation data items associated with the first memory operation from the first memory controller through the interconnect network to the second node comprising a second processor, a second memory, a second memory controller, a second transaction table, and a second access table;

storing the plurality of memory operation data items associated with the first memory operation to the second access table, wherein the second access table provides a mapping of memory addresses of the second memory and a list of memory operations affecting the memory addresses of the second memory, and wherein a memory address of the second memory is affected by the first memory operation;

receiving, by the second node, a plurality of memory operation data items associated with a second memory operation from a third node comprising a third processor, a third memory, a third memory controller, a third transaction table, and a third access table;

storing the plurality of memory operation data items associated with the second memory operation to the second access table, wherein the memory address of the second memory is affected by the second memory operation;

identifying, by the second access table, a memory conflict between the first memory operation and the second memory operation in response to the second memory operation also affecting the memory address of the second memory; and transmitting, in response to identifying the memory conflict, an abort signal from the second node to the first node and the third node.

8. The method of claim 7, further comprising:

transmitting an intent to commit signal from the first node to each node listed in the list of nodes in the first transaction table.

9. The method of claim 7, further comprising:

transmitting a commit okay signal from each node listed in the list of nodes in the first transaction table to the first node.

10. The method of claim 7 further comprising:

transmitting a commit done signal from the first node to each node listed in the list of nodes in the first transaction table.

11. The method of claim 7, further comprising:

identifying, by a compiler, the first memory operation affecting the list of nodes in the first transaction table; and forcing a write-through of the first memory operation affecting the list of nodes in the first transaction table.

12. The method of claim 7, further comprising:

aborting, by the first node, the first memory operation prior to transmitting a commit done signal to each node listed in the list of nodes in the first transaction table.

13. A non-coherent transactional shared memory system, comprising:

a plurality of nodes connected through an interconnect network, wherein each node of the plurality of nodes comprises:

a memory controller, a processor, and a memory module, wherein the memory controller is configured to receive a plurality of remote memory operation data items associated with a remote memory operation from one or more nodes of the plurality of nodes, and wherein the memory controller is configured to initiate a local memory operation to one or more nodes of the plurality of nodes;

a transaction table configured to store local memory operation data and a list of nodes affected by the local memory operation; and an access table configured to store a mapping between the remote memory operation and one or more memory addresses affected by the remote memory operation, wherein the memory controller is further configured to detect, by the access table, a memory conflict with one or more nodes of the plurality of nodes when the one or more memory addresses affected by the remote memory operation are also affected by one or more conflicting memory operations.

14. The transactional shared memory system according to claim 13, wherein the memory controller is further configured to store the plurality of remote memory operation data items to the access table.

15. The transactional shared memory system of claim 13, further comprising:
a compiler configured to:
identify the local memory operation affecting the list of nodes in the transaction table, and
force a write-through of the local memory operation affecting the list of nodes in the transaction table.

16. The transactional shared memory system according to claim 13, wherein each node of the plurality of nodes further comprises a reverse access table corresponding to the memory controller and configured to store transaction identification data and a list of pointers to entries in the access table corresponding to the transaction identification data.

* * * * *